United States Patent [19]

Kozai et al.

[11] 4,449,177
[45] May 15, 1984

[54] DISCHARGING CIRCUIT FOR POWER SOURCE DEVICE WITH RECTIFIER CIRCUIT

[75] Inventors: Yoshinori Kozai, Hino; Katsuo Kobari, Tachikawa; Keiji Sakamoto, Hino, all of Japan

[73] Assignee: Fujitsu Fanuc Limited, Tokyo, Japan

[21] Appl. No.: 354,099

[22] PCT Filed: Jun. 20, 1981

[86] PCT No.: PCT/JP81/00142
§ 371 Date: Feb. 22, 1982
§ 102(e) Date: Feb. 22, 1982

[87] PCT Pub. No.: WO82/00070
PCT Pub. Date: Jan. 7, 1982

[30] Foreign Application Priority Data

Jun. 20, 1980 [JP] Japan ................................. 55-82800

[51] Int. Cl.³ ............................................ H02M 7/06
[52] U.S. Cl. .................................. 363/126; 363/46
[58] Field of Search ........................... 363/44–48, 363/124, 126, 52–54; 323/223

[56] References Cited

U.S. PATENT DOCUMENTS

| | | | |
|---|---|---|---|
| 3,246,229 | 4/1966 | Lloyd | 363/48 |
| 3,670,230 | 6/1972 | Rooney et al. | 363/46 |
| 4,275,436 | 6/1981 | Peterson | 363/126 X |

FOREIGN PATENT DOCUMENTS 435580  7/1974  U.S.S.R.

*Primary Examiner*—Peter S. Wong
*Attorney, Agent, or Firm*—Armstrong, Nikaido, Marmelstein & Kubovcik

[57] ABSTRACT

A discharging circuit for a power source device with a rectifier circuit used in an power source for driving a motor in which when the alternating current power source is turned off and the load is electrically separated, the voltage of a time constant selection circuit (22, 23) falls rapidly, the voltage across a diode (25) rises, a Schmitt circuit (24) is activated, the circuit consisted of a transistor (27) and a resistor (26) is conducted, and a smoothing capacitor (28) is discharged, and hence the heat generation at the resistor is decreased and the concern over unsafety due to delayed discharge of the capacitor is eliminated.

4 Claims, 3 Drawing Figures

DISCHARGING CIRCUIT FOR POWER SOURCE DEVICE WITH RECTIFIER CIRCUIT

DESCRIPTION

1. Technical Field

The present invention relates to a discharging circuit for a power source device with a rectifier circuit.

2. Background of the Invention

The circuit shown in FIG. 1 has been used as a conventional high power rectified direct-current power source device, for example a direct-current power supply used to drive electric motors. Namely, an output of a rectifier circuit 11 is connected to the load through terminals 14 and 15, and the circuit 11 is connected in parallel to the load with a smoothing capacitor 12 for decreasing the ripple, and a dummy resistor 13. This circuit, however, suffers from the problem that the dummy resistor 13 is continually heated when the power source voltage is applied and the problem that a large capacitor value would result in a longer time constant of the circuit because of the high resistance value of the dummy resistor 13 and, thereby, causes concern over unsafe conditions due to delayed decrease of the voltage across the capacitor due to slow discharging.

The present invenion is proposed in order to solve the above-mentioned problems in the conventional circuit.

SUMMARY OF THE INVENTION

In consideration of the above-mentioned problems in conventional discharging circuits for power source devices with rectifier circuits, an object of the present invention is to decrease the generation of the heat at the resistor and eliminate the concern over safety due to delayed discharge of the capacitor, based on the idea of activating a switching circuit to connect the capacitor circuit with the resistor having low resistance value when the output voltage of the rectifier circuit falls below a predetermined value lower than the charged voltage of the smoothing capacitor.

According to the present invention, there is provided a discharging circuit for a power source device with a rectifier circuit, in which one terminal of said rectifier circuit is connected to one terminal of a smoothing capacitor and the other terminal of said rectifier circuit is connected to the other terminal of said smoothing capacitor through a diode, said smoothing capacitor being connected in parallel to a circuit consisting of a resistor and a circuit conducting transistor connected in series, said rectifier circuit having connected across its terminals a time constant selection circuit consisting of a resistor and a capacitor connected in parallel, the connecting point of said diode and said rectifier circuit and the base of said transistor having connected between them a Schmitt circuit, said time constant selection circuit and said Schmitt circuit being activated when said power source is turned off, whereby said circuit conducting transistor is made conductive, whereby said smoothing capacitor is discharged.

BEST MODE FOR CARRYING OUT THE INVENTION

Figure 1:
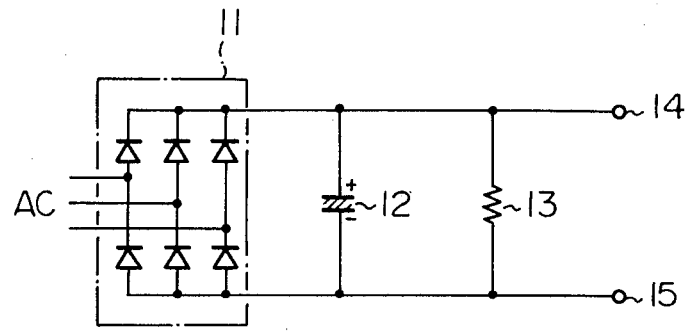
FIG. 1 is a circuit diagram of a conventional discharging circuit for a power source device with a rectifier circuit.
Figure 2:
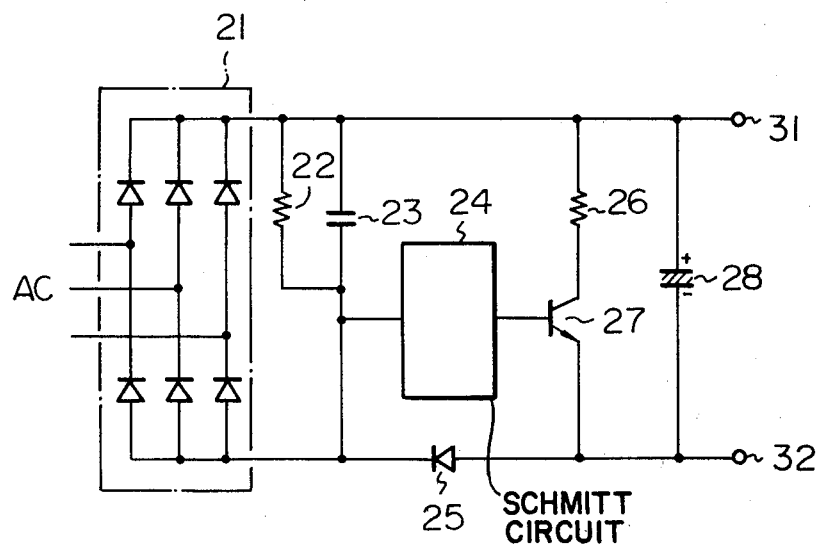
FIG. 2 is a circuit diagram of a discharging circuit for a power source device with a rectifier circuit according to an embodiment of the present invention.
Figure 3:
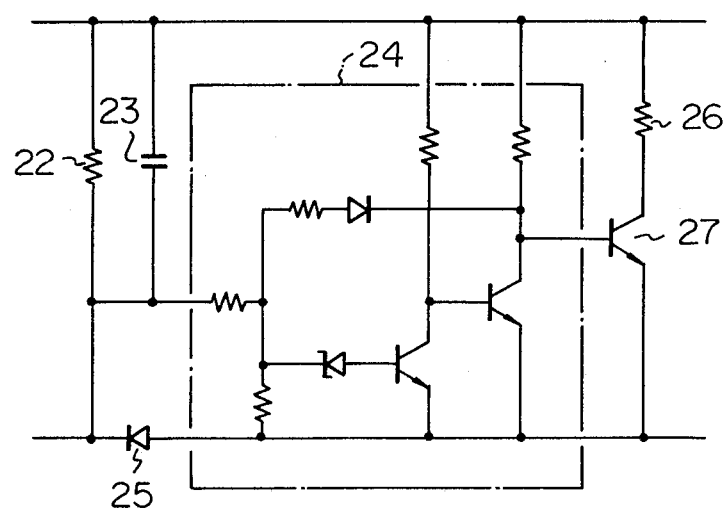
FIG. 3 is a circuit diagram of a Schmitt circuit used for the circuit in FIG. 2.

Below, a discharging circuit for a power source device with a rectifier circuit according to an embodiment of the present invention is explained in reference to FIG. 2. A rectifier circuit 21 is supplied with alternating current voltage and outputs rectified voltage. One output line is connected to a terminal 31, the other output line is connected to the cathode of a diode 25, and the anode of the diode 25 is connected to a terminal 32. A load (not shown) is connected between the terminals 31 and 32. The cathode of the diode 25 is also connected with one of the terminals of a resistor 22, one of the terminals of a capacitor 23, and the input terminal of a Schmitt circuit 24. The output of the Schmitt circuit 24 is connected to the base of a circuit conducting transistor 27, the emitter of the transistor 27 is connected to the anode of the diode 25, and the collector of the transistor 27 is connected to the terminal 31 through a resistor 26. A smoothing capacitor 28 is connected between the terminals 31 and 32. The other terminal of the resistor 22 and the other terminal of the capacitor 23 are connected to the terminal 31. A circuit diagram of an example of the Schmitt circuit 24 is shown in the broken-line box in FIG. 3.

The operation of the circuit according to the above-mentioned embodiment is explained below. In the normal operating condition at which the alternating current source is applied and the load is coupled, if the alternating current source is turned off and the load is electrically separated, the diode 25 is turned off and the circuit on the terminal side from the diode 25 is separated electrically from the circuit on the rectifier circuit 21 side. The circuit consisting of the resistor 22 and the capacitor 23, for which a small time constant was selected, discharges rapidly as compared with the capacitor 28, and the voltage across the capacitor 23 becomes low compared with the voltage across the capactor 28. The voltage between the terminals of the above-mentioned two capacitors is applied across the two terminals of the diode 25 as a reversed voltage to the diode. Since the Schmitt circuit 24 turns on the transistor 27 when the voltage across the diode 25 becomes, for example, 30 volts or more and turns off when the voltage across the diode 25 becomes 10 volts or less, under the condition when the voltage across the diode 25 becomes 30 volts or more, the transistor 27 turns on and the charge on the capacitor 28 can discharge through a resistor 26. Since the electric current is applied intermittently through a resistor 26, a resistor with a comparatively small wattage can be used for the resistor 26. When the alternating current power source is applied, the voltage of the rectifier circuit becomes higher than the voltage cross the capacitor 28, and the diode 25 is turned on, and hence the Schmitt circuit 24 turns off the transistor 27 and the circuit including the resistor 26 is turned off electrically.

We claim:

1. A direct-current power supply comprising:
  a rectifier connectable to an alternating-current power source for providing a direct-current output;

a pair of load terminals connected to said rectifier;
a smoothing capacitor connected between said load terminals;
a switching circuit connected between said load terminals in parallel with said smoothing capacitor;
a time constant selection circuit connected across the output of said rectifier;
a diode connected between said rectifier and one of said load terminals to permit flow of current from said rectifier to said load terminals and to prevent flow of current from said smoothing capacitor to said time constant selection circuit; and
a Schmitt circuit having its input connected to said time constant selection circuit and its output connected to said switching circuit and arranged to minimize said switching circuit in a non-conducting state when the rectified voltage across said time constant selection is substantially equal to the charged voltage of said smoothing capacitor and to turn on said switching circuit only when the voltage across said time constant selection circuit falls below a predetermined value lower than the charge voltage of said smoothing capacitor in response to disconnection of said power source, whereby said switching circuit operates to discharge said smoothing capacitor when said rectifier is disconnected from said power source.

2. A power supply as claimed in claim 1 wherein said time constant selection circuit comprises a resistor and a capacitor connected in parallel.

3. A power supply claimed in claim 1 wherein a resistor is connected in series with said switching circuit between said output terminals.

4. A power supply as claimed in claim 1 wherein said switching circuit comprises a transistor having its emitter and collector connected in series with a resistor across said output terminals and its base connected to the output of said Schmitt circuit.

* * * * *